US012103370B2

United States Patent
Kuntze et al.

(10) Patent No.: US 12,103,370 B2
(45) Date of Patent: Oct. 1, 2024

(54) LIFTGATE WITH BULKHEAD REINFORCEMENTS

(71) Applicant: Magna Exteriors Inc., Concord (CA)

(72) Inventors: Christopher J. Kuntze, Goodrich, MI (US); Riad Chaaya, Clarkston, MI (US); Keijo J. Huotari, Fenton, MI (US); Scott Varisto, St. Clair, MI (US); Trevor Geiger, Imlay City, MI (US); Dennis Wiedenbeck, Livonia, MI (US); Tejaswi Vemuri, Lake Orion, MI (US); Himat Taank, Troy, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 17/849,142

(22) Filed: Jun. 24, 2022

(65) Prior Publication Data
US 2022/0410676 A1    Dec. 29, 2022

Related U.S. Application Data

(60) Provisional application No. 63/216,312, filed on Jun. 29, 2021.

(51) Int. Cl.
B60J 5/10    (2006.01)

(52) U.S. Cl.
CPC .................................. B60J 5/107 (2013.01)

(58) Field of Classification Search
CPC ............ B60J 5/107; B60J 5/101; Y02T 10/82
See application file for complete search history.

(56) References Cited

U.S. PATENT DOCUMENTS

| | | | |
|---|---|---|---|
| 8,480,167 B2 * | 7/2013 | Flajnik | B60R 13/04 296/209 |
| 9,981,534 B2 * | 5/2018 | Dassen | B60J 5/10 |
| 10,272,750 B2 * | 4/2019 | Costa | B62D 35/007 |
| 10,549,611 B2 * | 2/2020 | Chaaya | B29C 66/73921 |
| 10,752,097 B2 * | 8/2020 | Adachi | B60J 5/101 |
| 10,926,812 B2 * | 2/2021 | Ukra | B62D 33/0273 |
| 11,643,026 B2 * | 5/2023 | Rajon | B29C 45/14819 296/193.08 |
| 2022/0324310 A1 * | 10/2022 | Aitharaju | B32B 15/14 |

* cited by examiner

*Primary Examiner* — Janet M Wilkens
*Assistant Examiner* — Susan M. Heschel
(74) *Attorney, Agent, or Firm* — Warn Partners, P.C.

(57) ABSTRACT

A liftgate integrating bulkhead reinforcements into an inner panel and/or outer panel of the liftgate or closure creating an efficient design that adds mold-in reinforcement structure and eliminates the need to add steel or plastic parts to meet performance requirements.

17 Claims, 6 Drawing Sheets

US 12,103,370 B2

LIFTGATE WITH BULKHEAD REINFORCEMENTS

CROSS-REFERENCE TO RELATED APPLICATIONS

This application is a Non-Provisional Patent Application and claims benefit of U.S. Provisional Patent Application No. 63/216,312, filed Jun. 29, 2021. The disclosure of the above application is incorporated herein by reference.

FIELD OF THE INVENTION

The present invention relates to a part with a plurality of integrated bulkhead ribs, such as in a header area of a molded part adapted for a vehicle.

BACKGROUND OF THE INVENTION

Liftgates and other closures like side doors sometimes have inadequate structure between the inner and outer panels and have trouble meeting performance requirements. Additional steel or plastic reinforcements or panels and fasteners being added to allow the liftgate or closure assembly to meet the performance requirements is known. An extra steel panel or plastic panel could be added to reinforce the area of concern, but this drives up the investment cost, part count, piece price, labor cost, build time, added mass, increase build variation, potential for mis builds, buzz squeak and rattle.

Accordingly, there is needed a liftgate with improved structure and predetermined performance without adding parts or driving the cost up.

SUMMARY OF THE INVENTION

In accordance with the present invention, there is provided a part adapted for a vehicle (e.g., thermoplastic part, molded part, liftgate, door, tailgate, panel, hood, fascia, rocker, closure panel, thermoplastic closure panel, spoiler, removable spoiler, under spoiler, closure panel, deck lid, trunk, etc.) integrating at least one predetermined reinforcement (rib, a plurality of bulkhead ribs, etc.) in at least one predetermined location (e.g., into at least one inner panel or at least one outer panel of the part (e.g., at least one liftgate panel) or any suitable closure panel adapted for a vehicle, thereby creating an efficient design that eliminates the need to add extra parts (e.g., reinforcement plates, reinforcement panels, steel, etc.) and eliminates the issues noted above.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the figures generally, in accordance with the present invention, there is provided a part 10 adapted for a vehicle (e.g., thermoplastic part, molded part, liftgate, multi-panel part, door, tailgate, panel, pillar trim, roof, hood, fascia, closure panel, etc.) integrating reinforcements 14, preferably, at least bulkhead ribs, into at least one panel 12 (e.g., into at least one first panel or at least one second panel, such as an inner panel, outer panel, or a closure panel, and any combinations thereof) of the part, and creating an efficient design that eliminates the need to add extra parts (e.g., extra steel reinforcement, composite reinforcements, tape, tether, plate, brackets, etc.) and eliminates the issues noted above.

The integrated reinforcements 14, e.g., bulkhead type ribs, are incorporated into the design of the existing first panel 12 (e.g., inner panel), second panel 18 (e.g., outer panel or other suitable part), or both. Bulkhead ribs add structure without adding additional parts and additionally allows for selective additional predetermined attachment(s), such as bonding, plastic welding, infrared welding, welding, 2-side tape, adhesive, and any combinations thereof.

Figure 1:
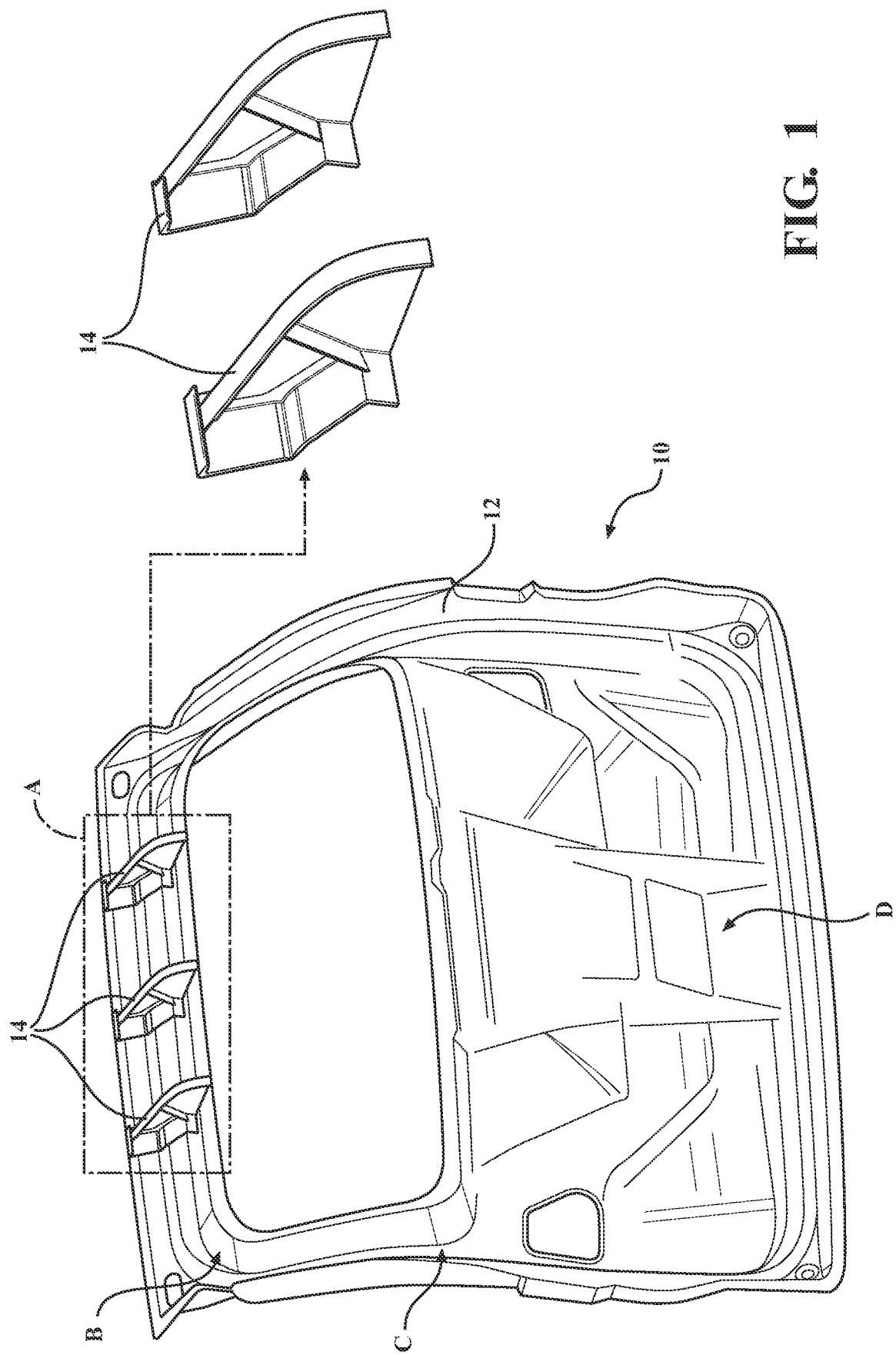
FIG. 1 is a perspective view of a first panel for a liftgate adapted for a vehicle depicting exemplary reinforcements, in accordance with the present invention.
Figure 2:
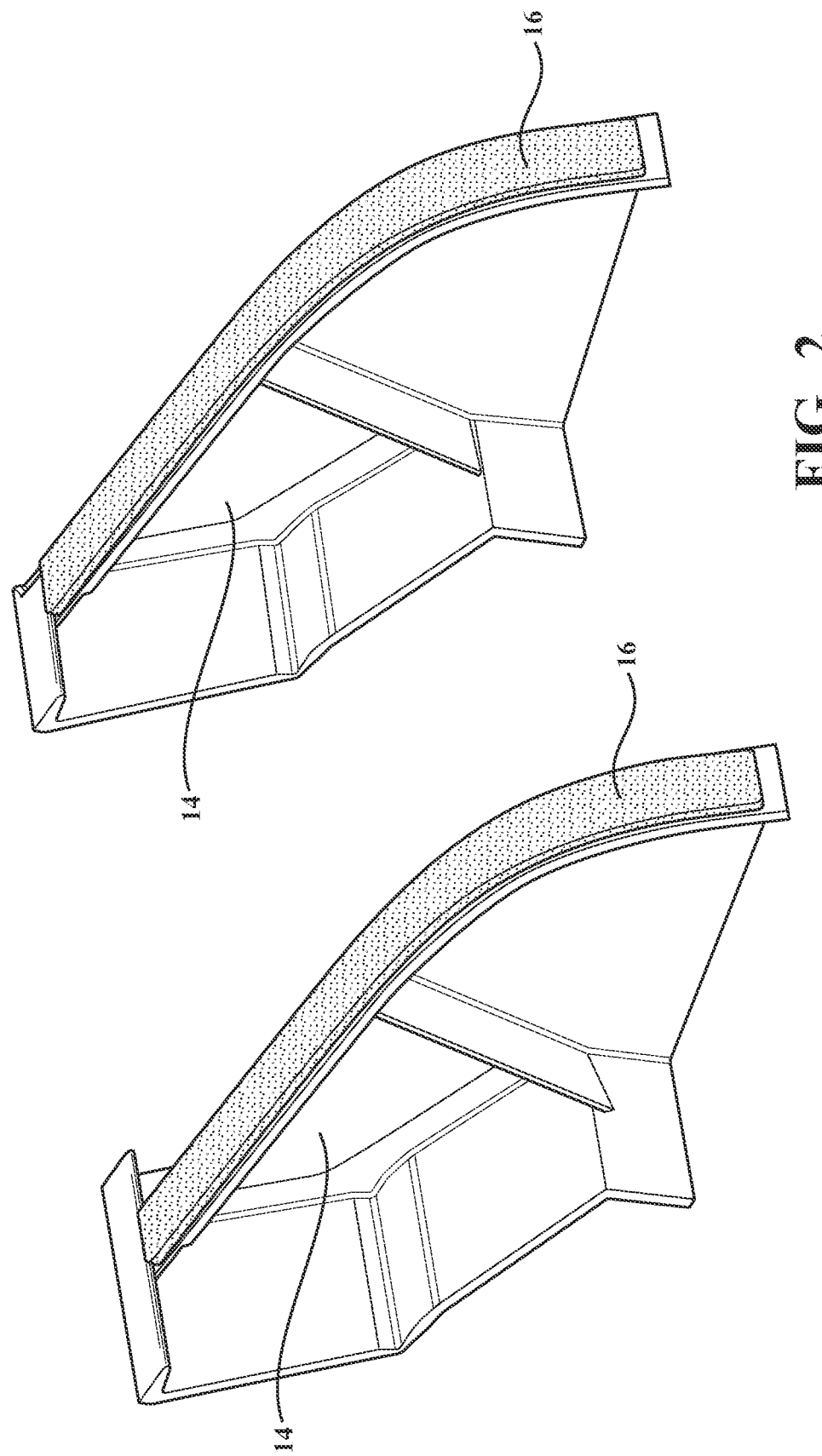
FIG. 2 is a left side perspective view of the exemplary reinforcements and including additional structure for bonding, in accordance with the present invention.
Figure 3:
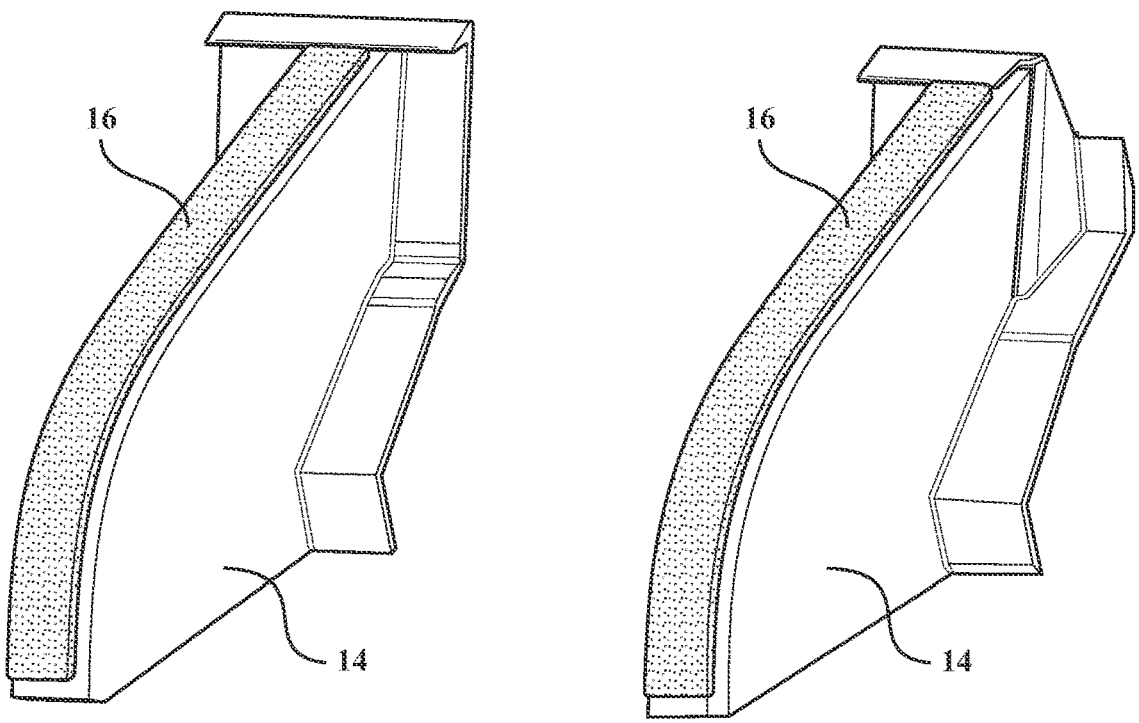
FIG. 3 is a right side perspective view of the exemplary reinforcements and including the additional structure for bonding, in accordance with the present invention.
Figure 4:
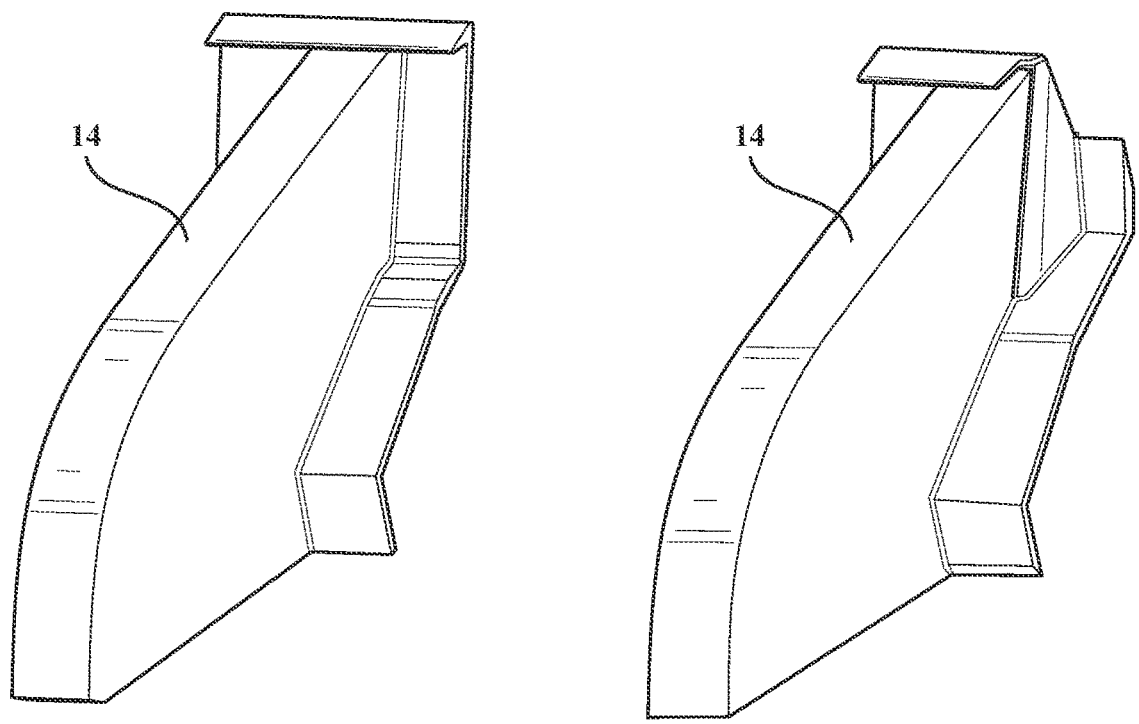
FIG. 4 is a right side perspective view of the exemplary reinforcements, in accordance with the present invention.
Figure 5:
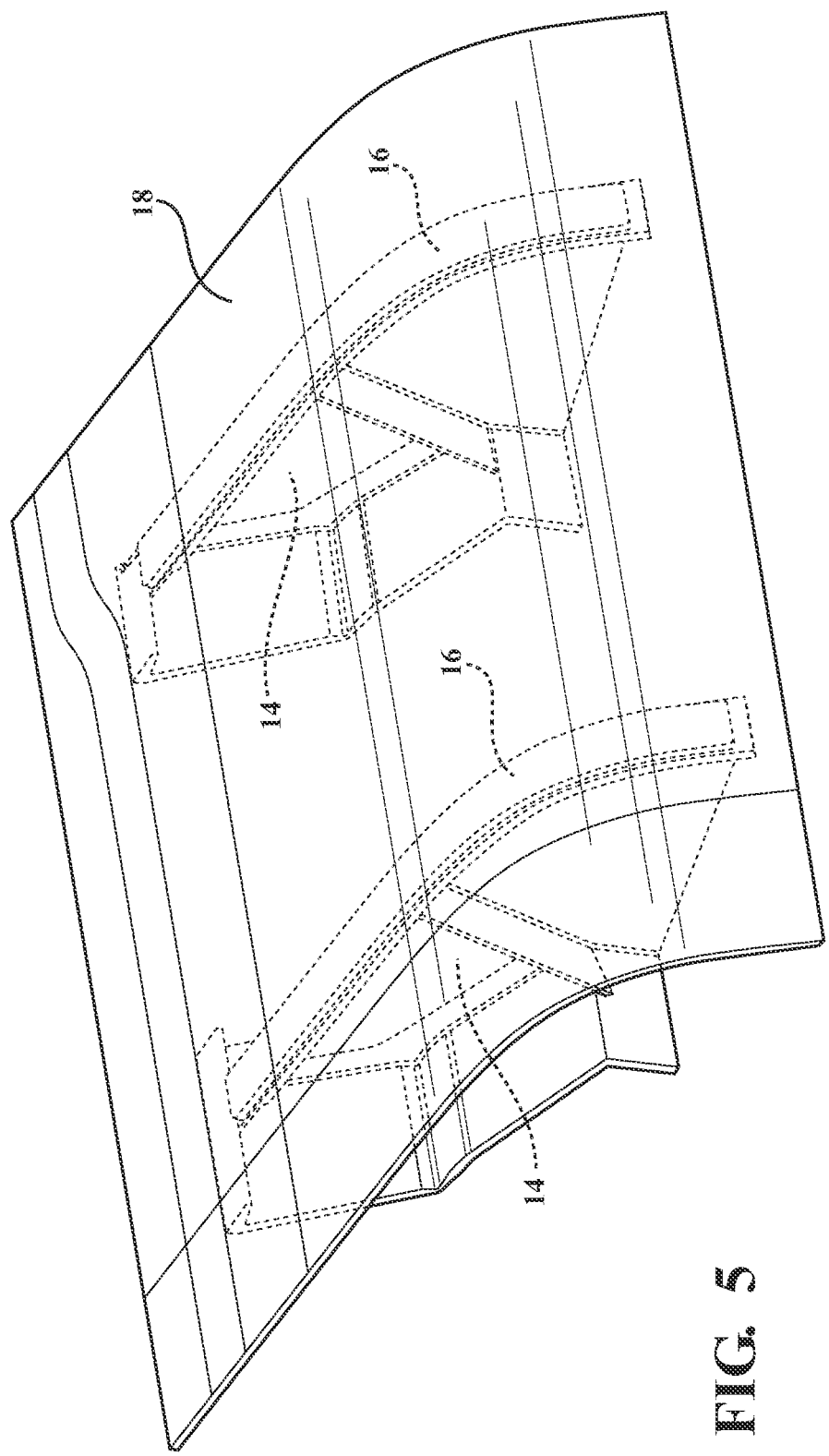
FIG. 5 is an enlarged perspective view taken generally at bulkhead area 'A' of FIG. 1, depicting the exemplary reinforcements formed into the first panel and a second panel coupled to at least the reinforcements, in accordance with the present invention.
Figure 7:
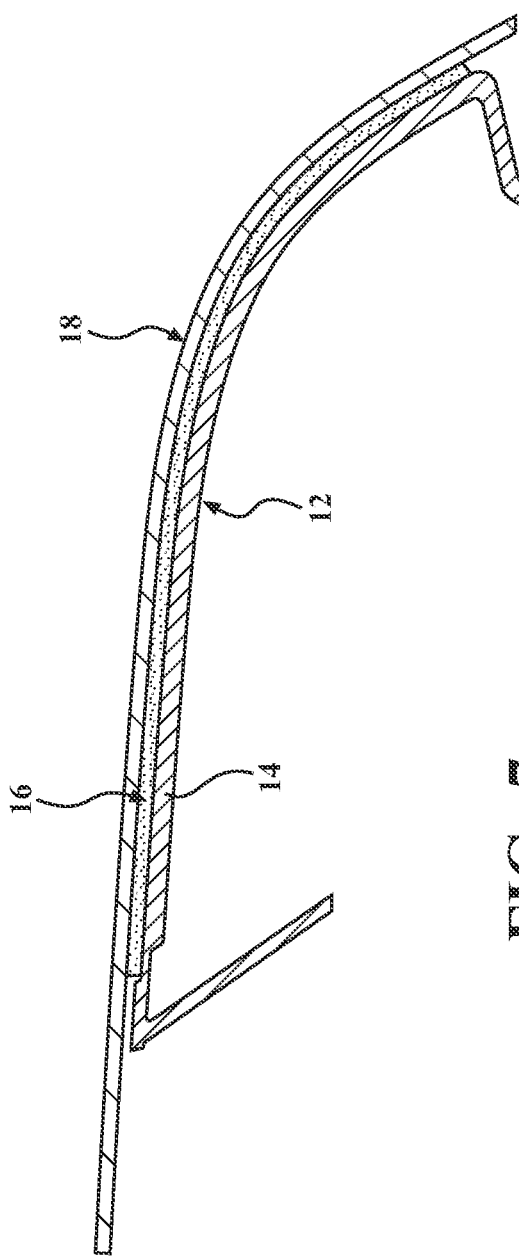
FIG. 7 is a cross sectional view taken at A-A in FIG. 6 depicting the reinforcements coupled to the second panel, in accordance with the present invention.
Figure 6:
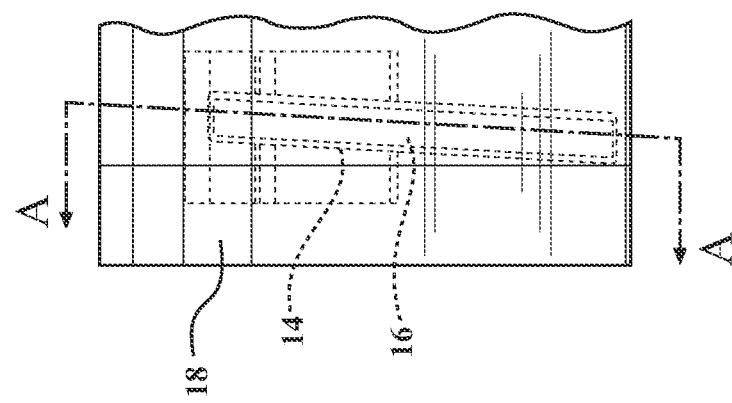
FIG. 6 is a front elevation cross-sectional view of FIG. 5.
Figure 9:
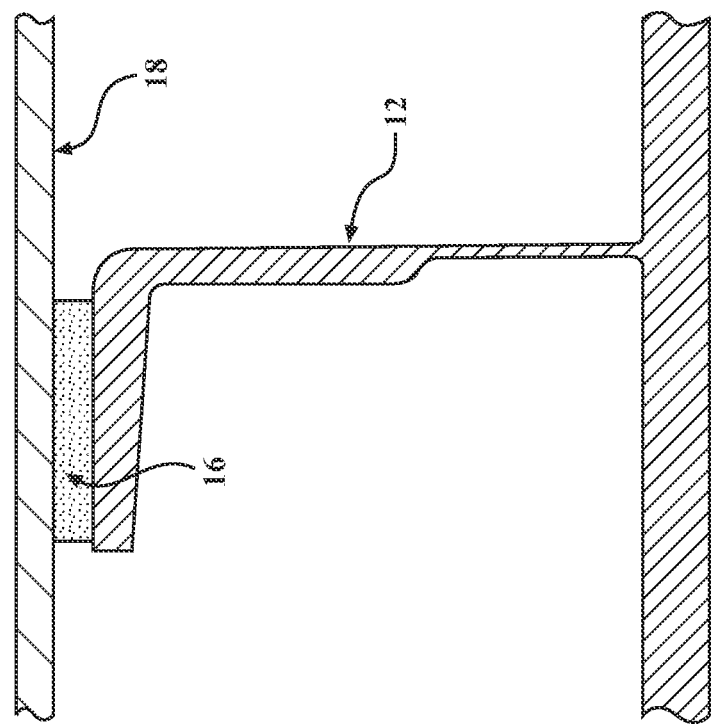
FIG. 9 is a cross sectional view taken at B-B in FIG. 8, in accordance with the present invention.
Figure 8:
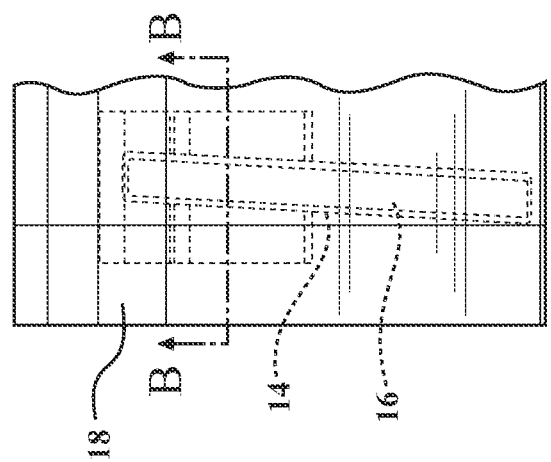
FIG. 8 is a front elevation cross-sectional view of FIG. 5.

Referring generally to FIGS. 1-9, there is provided a liftgate generally indicated at 10 adapted for a vehicle (e.g., thermoplastic liftgate panels with an opening for a rear window) with at least one first panel 12 (e.g., closure panel, inner panel, and/or outer panel, etc.) integrating at least one reinforcement structure shown generally at 14 in at least one predetermined location on the liftgate 10; preferably, a plurality of ribs 14 as reinforcements; most preferably, at least a plurality of bulkhead ribs 14—thereby creating an efficient design that eliminates the need to add extra parts (e.g., added parts like extra steel reinforcement, composite reinforcements, plastic reinforcements, fasteners, tape, tether, brackets, steel or plastic panels, etc.) to improve structure and performance without driving up costs. The integrated reinforcements can be lighter weight than steel. FIG. 1 depicts a first panel 12 with a bulkhead area generally shown at 'A' incorporating a plurality of reinforcements 14, and depicting, in a broken-away portion of FIG. 1, reinforcements 14 that are ribs. The at least one first panel 12 is preferably an inner panel.

The at least one reinforcement 14 is an operably molded-in reinforcement in at least one predetermined location on at least the first panel 12, preferably, a plurality of molded-in bulkhead reinforcements, more preferably, the molded-in bulkhead reinforcement is molded in the inner panel 12, most preferably, a plurality of molded-on ribs in the bulkhead area of the at least one first panel 12 (e.g., an inner panel adapted for a liftgate). While three reinforcements 14 are depicted in FIG. 1, it is understood that more or less reinforcements 14 can be used depending on the application without departure from the scope of the present invention. It is further understood that additionally located reinforcements, or alternatively located reinforcements, can be used depending on the application without departure from the scope of the present invention (e.g., side reinforcements at the side of the panel opening 'C' lift assist attachment area, or counterbalance strut area; latch area 'D', upper corners B' or hinge areas, lower corners, under window opening, closure, access door, latch area, etc. and/or additionally on a second panel such as an outer panel, etc.).

Having molded-in reinforcements has significant advantages over having to adhere, weld, or fasten additional reinforcements (such as steel or plastic reinforcements), including, but not limited to, material expense, costs, and assembly time.

FIG. 1 depicts the plurality of reinforcement ribs 14 molded into at least a first area 'A' that is a bulkhead area of the at least one first panel 12 (e.g., most preferably, an inner panel) of the part 10 (most preferably, a liftgate that is operably adaptable to connect at a rear opening of a vehicle). It is understood that the ribs 14 may be formed in an outer panel of the liftgate or any other predetermined closure panel adapted for an automobile. It is understood that any alternatively suitably shaped and numbered molded reinforcements 14 at predetermine location(s) can be used depending on the application without departure from the scope of the present invention. The ribs 14 can be solid. Alternatively, the ribs 14 have at least one opening for decreased material use and a webbing structure that does not sacrifice strength to meet predetermined performance requirements. The ribs can extend in any number of predetermined directions relative to the first panel 12 and/or second panel 18 (and any other predetermined additional panel), depending on the application without departure from the present invention.

FIGS. 3-9 depict the exemplary bulkhead reinforcements 14 integrated into the first panel 12 (e.g., inner panel) and includes at least one additional attachment member 16 disposed at a predetermined location, preferably, adhesive for bonding disposed at predetermined locations. The adhesive 16 is preferably located on at least the reinforcements 14 and may additionally be located adjacent to the reinforcements 14 or other predetermined areas of the first panel 12 or second panel 18, such as, but not limited to, generally in a transverse direction to the longitudinal axis of the ribs 14. Most preferably, the adhesive 16 that is on at least the reinforcements 14 (and selectively on any additional predetermined locations) provides additional structure for bonding at least one second panel 18 (e.g., outer panel) to the at least one first panel 12 (e.g., inner panel).

Alternatively, the bonding of parts (e.g., inner and outer panels together) are by plastic welding, infrared welding, 2-sided tape, at least one adhesive type, and any combinations thereof.

The present invention preferably provides the integrated bulkhead ribs in a header area. Most preferably, the plurality of reinforcements 14 are bulkhead ribs molded in the header of the first panel 12 (preferably, an inner panel) and each include additional members 16 (preferably, adhesive) that operably connect to the second panel 18 (preferably, an outer panel).

In accordance with aspects of the present invention, the first and second panels 12 and 18 are operably connected with adhesive. The adhesive can be operably cured in accordance with an aspect of the present invention (e.g., heat, moisture, chemical, heat resistant, welding heat resistant, at ambient temperature, etc. or any suitable bonding based upon the particular application and combinations thereof).

In accordance with aspects of the present invention, the first and second panels 12,18 are, additionally or alternatively, operably connected with welding (e.g., IR welding).

In accordance with aspects of the present invention, the first and second panels 12, 18 can be operably connected with adhesive and welding at predetermined locations.

In accordance with aspects of the present invention, the reinforcements 12 extend in opposite directions, such that the ribs, for example, extend generally outward from opposing surfaces of the first and/or second panels 12,18.

The present invention further comprises a process of molded in reinforcements, most preferably, a method of manufacturing a liftgate including providing predetermined tooling and molding the liftgate incorporating molded-in bulkhead reinforcements.

While ribs are shown and described, it is understood that any predetermined shaped and configured (and number) of reinforcements is contemplated depending on the application without departure from the scope of the present invention.

It is understood that the at least one predetermined area of reinforcement is any predetermined location(s) of the part depending on the application without departure from the scope of the present invention (e.g., upper corners, lower corners, D-pillar areas, strut areas, at sides of window opening, latch mechanism area, on outer panel area(s), hinge(s), latch(es), counterbalance struts, high load areas, etc., and any combinations thereof).

The panels and ribs are preferably thermoplastic. It is understood that any alternative material, or plurality of materials, suitable for predetermined structural and performance requirements is contemplated depending on the application without departure from the scope of the present invention.

While a liftgate is shown, it is understood that the present invention incorporates any predetermined part adapted for a vehicle, e.g., door, tailgate, removable spoiler, under spoiler, closure panel, etc., depending on the application without departure from the scope of the present invention.

While a panel is shown (e.g., inner or outer panel, inner or outer tailgate panel, etc.), it is understood that the present invention incorporates any predetermined component (e.g., rocker panel, molded part, closure panel, etc.) with integrated reinforcements (e.g., at least one rib reinforcement) adapted for a vehicle depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate adapted for a vehicle, comprising:
   at least one first panel; and
   a plurality of reinforcements integrally molded to said first panel at predetermined locations of a central header portion of said first panel for predetermined structural strength and without adding parts for strength to meet predetermined performance requirements, said plurality of reinforcements each including a curvilinear longitudinal surface operably adapted to provide a bonding surface extending uninterrupted the length of said curvilinear longitudinal surface.

2. The liftgate of claim 1, wherein the reinforcements are a plurality of ribs.

3. The liftgate of claim 1, further comprising a second panel operably connected to the first panel.

4. The liftgate of claim 1, further comprising a second panel operably connected to the first panel by adhesive.

5. The liftgate of claim 1, further comprising a second panel operably connected to the first panel by plastic welding.

6. The liftgate of claim 1, further comprising adhesive along said longitudinal surface of each of the plurality of reinforcements to bond a second panel over the plurality of reinforcements.

7. The liftgate of claim 1, wherein the first panel is an inner panel.

8. The liftgate of claim 1, wherein the first panel is an outer panel.

9. The liftgate of claim 1, wherein the plurality of reinforcements are ribs and adhered to at least one second panel of the liftgate.

10. A liftgate adapted for a vehicle, comprising:
    at least one first panel;
    a plurality of rib reinforcements integrally molded centrally in a bulkhead of at least said at least one first panel for structural strength to meet predetermined performance requirements, each of said plurality of rib reinforcements including an uninterrupted curvilinear surface operably adapted to selectively receive adhesive in the longitudinal direction of each of said surfaces.

11. The liftgate of claim 10, wherein said plurality of rib reinforcements are integrally molded to said at least one first panel.

12. The liftgate of claim 10, further comprising at least one second panel operably coupled to the at least one first panel.

13. The liftgate of claim 12, wherein said at least one second panel additionally includes a plurality of rib reinforcements.

14. The liftgate of claim 10, wherein the plurality of rib reinforcements are adhered to at least one outer panel of the liftgate.

15. The liftgate of claim 10, wherein said plurality of rib reinforcements extend in a rearward direction from a backside of a bulkhead reinforcement area of the at least one first panel.

16. A liftgate adapted for a motor vehicle, comprising:
    at least one inner panel including a header portion;
    a plurality of raised reinforcements integrally molded centrally at the header portion of said at least one inner panel, said plurality of raised reinforcements including a curvilinear longitudinal surface; and
    at least one outer panel operably coupled to said curvilinear longitudinal surface of said plurality of reinforcements.

17. The liftgate of claim 16, wherein the plurality of reinforcements are connected to said at least one outer panel with adhesive.

* * * * *